United States Patent Office 2,694,711
Patented Nov. 16, 1954

2,694,711

QUINAZOLONE ANTIMALARIAL COMPOUNDS

Bernard Randall Baker, Nanuet, N. Y., and Robert Eugene Schaub, Paramus, N. J., assignors to American Cyanamid Company, New York, N. Y., a corporation of Maine No Drawing. Application December 2, 1952,
Serial No. 323,714

16 Claims. (Cl. 260—256.4)

This invention relates to new organic compounds and processes of preparing the same.

Among the compounds within the scope of the present invention are those that may be represented by the following general formula:

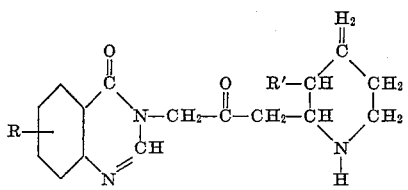

R represents at least one substituent selected from the group consisting of hydroxy groups; nitro groups; lower acylamido groups as illustrated by formamido and acetamido; halogen substituents as illustrated by fluorine, chlorine, and bromine; lower alkyl groups as illustrated by methyl, ethyl, propyl and butyl; halogen substituted lower alkyl groups as illustrated by trifluoromethyl and chloroethyl; lower alkoxy groups as illustrated by methoxy and ethoxy; lower alkylmercapto groups as illustrated by methylmercapto and ethylmercapto; and lower divalent hydrocarbon substituents as illustrated by a benzo substituent. Such substituents may be on one or more of the 5, 6, 7 and 8 positions of the quinazolone nucleus. R' represents a member selected from the group consisting of hydrogen, hydroxy groups, and lower acyloxy groups as illustrated by acetoxy and $C_2H_5$—COO— groups.

Compounds having the general formula above are physiologically active as anti-malarial agents some being many times more active than quinine.

Compounds having the above structure may be prepared by the hydrolysis of compounds having the following formula:

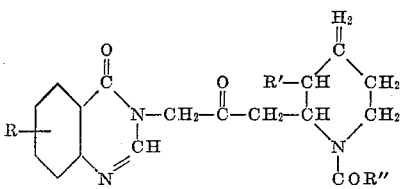

In the above, R and R' are unchanged in the reaction and are the same in the intermediate as in the desired product. R" is a radical such as in —$OC_2H_5$, —$OCH_2C_6H_5$, —$OC_6H_5$, —$C_6H_5$ and substituted phenyl radicals. Other radicals will readily occur to those in the art since the reaction is a comparatively simple one in which the group COR" is removed by hydrolysis and is replaced with a hydrogen atom as in the final product shown above.

The hydrolysis of the group—COR" is preferably brought about by heating the compounds with a strong inorganic acid. Various acids such as hydrochloric, sulphuric, phosphoric, hydrobromic and hydroiodic may be used as the hydrolyzing agent. The weaker acids such as acetic may be used as dilutents for the hydrolyzing acid but are generally not strong enough to accomplish the desired hydrolysis. The strength of the acid may vary from about 2 N to 12 N and the heating period from about a few minutes up to fifteen hours or more depending upon the temperature and strength of the acid. 48% hydrobromic acid at 125° will bring about the hydrolysis is about six minutes but 18% hydrochloric acid requires a longer time. Because of the fact that the R' group may come off under drastic conditions, particularly with some acids, a small amount of experimentation may be required in special instances. It is believed, however, that one skilled in the art of hydrolysis will have little difficulty in determining the optimum conditions for each particular reaction.

The preparation of a number of compounds of the present invention will be illustrated by means of specific examples which follow. Inasmuch as some of the intermediates that are required preparatory to the hydrolysis step are new compounds, the description will proceed from known substances. As some of the intermediates are new and useful and the methods of forming them are likewise new, these are also considered as forming part of the present invention and will be claimed herein or in divisional applications.

Example 1

A solution of 250 mg. of piperidyl-2-acetic acid (Ber., 35, 1348) in 4.1 cc. of 1 N sodium hydroxide was vigorously shaken with 0.21 cc. of benzoyl chloride for ten minutes, then acidified with hydrochloric acid. The mixture was extracted with chloroform. Evaporation of the extracts and crystallization from benzene-heptane gave 180 mg. of white crystals, of 1-benzoyl-2-piperidyl acetic acid, M. P. 144–145°. This compound is soluble in hot water, insoluble in cold water or petroleum ether, but readily soluble in alcohol, chloroform or benzene.

To a suspension of 5 g. of 1-benzoyl-2-piperidylacetic acid in 25 cc. of acetyl chloride was added 4.5 g. of phosphorus pentachloride. After twenty minutes the solvent was removed in vacuo and the evaporation repeated with 50 cc. of toluene. The resultant acid chloride dissolved in 25 cc. of benzene was added to an ice-cooled ethereal solution of diazomethane (prepared from 10.5 g. of nitrosomethylurea). After ten minutes in the ice-bath and one hour at room temperature, 5 cc. of acetic acid followed by 21 cc. of 30% hydrogen bromide in acetic acid were added. The mixture, after five minutes, was washed with water, aqueous sodium bicarbonate and water. Evaporation of the solvent in vacuo gave 5.2 g. of 1-benzoyl-2-(γ-bromoacetonyl) piperidine as an orange oil which was soluble in all solvents except water and the petroleum ether.

To a solution of 225 mg. of 4-quinazolone in 1.55 cc. of 1 N methanolic sodium methoxide was added a solution of 0.58 g. of 1-benzoyl-2-(γ-bromo-acetonyl) piperidine in 5.8 cc. of methanol. After one hour the solution was diluted with 25 cc. of water and 10 cc. of sodium hydroxide, then extracted with chloroform. The extracts were evaporated to dryness and the residue converted to the hydrochloride with alcoholic hydrogen chloride; yield, 420 mg. of white crystals of 3-[β-keto-γ-(1-benzoyl-2-piperidyl)propyl]-4-quinazolone hydrochloride, M. P. 195–196°. This compound is soluble in cold water, hot methanol or ethanol, but insoluble in acetone, ethyl acetate, benzene or petroleum ether.

A solution of 300 mg. of 3-[β-keto-γ-(1-benzoyl-2-piperidyl) propyl]-4-quinazolone hydrochloride in 6 cc. of 6 N hydrochloric acid was refluxed for five hours, then evaporated to dryness in vacuo. The residue was heated to boiling with absolute alcohol containing hydrogen chloride and cooled; yield, 175 mg. of white crystals of 3[β-keto-γ-(2-piperidyl)propyl]-4-quinazolone dihydrochloride monohydrate, M. P. 227–229° dec. The compound is extremely soluble in water, soluble in hot methanol and insoluble in ethanol, acetone, benzene or petroleum ether.

Example 2

To a solution of 7 g. of sodium methoxide in 100 cc. of methanol was added 20.6 g. of 3-chloro-3-carbethoxy-2-piperidone (J. Am. Chem. Soc., 71, 2818 (1949)). The solution was refluxed and stirred for ninety minutes, acidified with acetic acid and cooled. The salt was removed by filtration and the filtrate evaporated to dryness. A little water was added and the solution extracted with chloroform. The solvent was removed in vacuo and the residue distilled. The product was a colorless viscous oil, B. P. 142–150° (0.15 mm.) which solidified and melted at 60–70°; yield, 10.6 g. (57%).

Several recrystallizations from benzene-petroleum ether gave white crystals, M. P. 79.5–80° of 3-methoxy-3-carbomethoxy-2-piperidone. This compound is readily soluble in water, alcohol, acetone and benzene, but insoluble in petroleum ether.

A solution of 36.4 g. of 3-methoxy-3-carbomethoxy-2-piperidone in 122 cc. of 6 N hydrochloric acid was refluxed for one hour then evaporated to dryness in vacuo. The residual crude 2-methoxy-5-aminovaleric acid hydrochloride was dissolved in 430 cc. of water containing 37.3 g. of sodium hydroxide, then treated dropwise with 60 cc. of benzyl chlorocarbonate with stirring and ice-cooling at such a rate that the temperature was 6–8°. After being stirred an additional forty-five minutes, the mixture was extracted with ethyl acetate. Acidification of the aqueous phase gave an oil which was isolated by extraction with ethyl acetate; yield, 43.6 g. The 2-methoxy-5-carbobenzoxyaminovaleric acid forms white crystals from benzene-petroleum ether, M. P. 63–65°. This compound is soluble in all solvents except water and petroleum ether.

To a solution of 83 g. of 2-methoxy-5-carbobenzoxyaminovaleric acid in 200 cc. of acetyl chloride was added 67 g. of phosphorus pentachloride in portions over a period of seven minutes. Hydrogen chloride was evolved and the reaction was slightly exothermic. After standing for twenty-three minutes more, the solution was evaporated to dryness in vacuo (bath 50°). The residual acid chloride, dissolved in 200 cc. of toluene, was condensed with 141 cc. of ethyl malonate and 66.2 g. of magnesium methoxide in 300 cc. of toluene. The mixture was treated with 59 cc. of acetic acid and 230 cc. of 3 N hydrochloric acid. The separated toluene layer was washed with water and evaporated to dryness in vacuo. The residual oil was dissolved in 200 cc. of toluene and 500 cc. of heptane, then extracted three times with ice-cold 3% sodium hydroxide. Acidification gave an oil which was isolated by extraction with ethyl acetate; yield, 60 g. of oil which gave a red color with alcoholic ferric chloride. This ethyl (2-methoxy-5-carbobenzoxyaminovaleryl)malonate is readily soluble in most solvents except water and petroleum ethers. It is also soluble in aqueous sodium hydroxide.

A solution of 25 g. of ethyl (2-methoxy-5-carbobenzoxyaminovaleryl)malonate in 75 cc. of acetic acid was shaken with 5 g. of Norit for ten minutes. The mixture was filtered and the Norit washed with 25 cc. of acetic acid. The filtrate was shaken with hydrogen in the presence of 5 g. of 10% palladium charcoal for about one hour when the hydrogenation stopped with 70% uptake of one mole-equivalent of hydrogen. Then, 500 mg. of platinum oxide catalyst was added and the hydrogenation continued. At the end of three hours, the reduction had stopped. The catalysts were removed by filtration and the filtrate was evaporated to dryness in vacuo.

The crude 3-methoxy-piperidine-2-malonic ester was refluxed with 128 cc. of 6 N hydrochloric acid for two hours. The solution was evaporated to dryness in vacuo. The residual gum was dissolved in 42 cc. of water, cooled in an ice-bath with stirring and treated with 74 cc. of 10% sodium hydroxide. When the temperature returned to 6° C., a solution of 6.2 cc. of ethyl chlorocarbonate in 30 cc. of toluene was added over a period of ten minutes. After being stirred fifteen minutes more, 50 cc. of 10% sodium hydroxide was added followed by the dropwise addition 6.2 cc. of ethyl chlorocarbonate in 30 cc. of toluene. The solution was stirred one hour more in the ice-bath, then extracted with ethyl acetate. The aqueous layer was acidified and extracted with chloroform. The combined extracts were evaporated to dryness in vacuo; yield, 5.3 g. (37%) of a viscous oil. This 1-carbethoxy-3-methoxy-2-piperidine-2-acetic acid was slightly soluble in water, soluble in alcohol, acetone and benzene, but insoluble in petroleum ether.

To a solution of 5.3 g. of 1-carbethoxy-3-methoxy-piperidine-2-acetic acid in 25 cc. of acetyl chloride was added 5.1 g. of phosphorus pentachloride. After twenty minutes solvent was removed in vacuo (bath 45–50°), then 37 cc. of toluene was added and the evaporation repeated. The residual acid chloride dissolved in 33 cc. of benzene was added dropwise to an ice-cooled solution of ethereal diazomethane (prepared from 13 g. of nitrosomethylurea) over a period of seven minutes. After ten minutes more in the ice-bath, the solution was allowed to stand at room temperature for seventeen hours. The excess diazomethane was destroyed by the addition of 7.8 cc. of acetic acid. Then 24 cc. of 30% hydrobromic acid in acetic acid was gradually added with ice-cooling. After an additional five minutes the solution was washed twice each with water, excess aqueous sodium bicarbonate and water. The solution was evaporated to dryness in vacuo; yield, 5.1 g. (73%) of a light brown oil of 1-carbethoxy-2-(γ-bromoacetonyl)-3-methoxypiperidine which was readily soluble in organic solvents except petroleum ether and was also insoluble in water.

To a solution of 2.15 g. of 4-quinazolone in 15 cc. of 1 N sodium methoxide was added a solution of 5.1 g. 1-carbethoxy-2-(γ-bromoacetonyl)-3-methoxypiperidine in 51 cc. of methanol. After one hour at room temperature the solution was diluted with 205 cc. of ice water and 82 cc. of 10% sodium hydroxide. A gum separated which was removed by extraction with chloroform. The combined extracts were evaporated to dryness in vacuo. The residue (4.6 g.) was crystallized from benzene-heptane; yield, 2.3 g., M. P. 137–139°. Recrystallization from the same solvents gave white crystals, M. P. 138–140°, of 3-[β-keto-γ-(1-carbethoxy-3-methoxy-2-piperidyl)propyl]-4-quinazolone. This compound was readily soluble in alcohol, acetone, benzene, chloroform, or ethyl acetate, but insoluble in petroleum ether or water.

A solution of 1 g. of 3-[β-keto-γ-(1-carbethoxy-3-methoxy-2-piperidyl)-propyl]-4-quinazolone in 10 cc. of 48% hydrobromic acid was refluxed for six minutes, then evaporated to dryness in vacuo. The residue was dissolved in 10 cc. of absolute alcohol and the evaporation repeated. Trituration with acetone gave a tan hydroscopic dihydrobromide which contained about 20% 3-[β-keto-γ-(3-hydroxy-2-piperidyl)propyl] - 4 - quinazolone; yield, 1.22 g., M. P. 152–160° dec. This crude material was readily soluble in water, methanol or ethanol, but insoluble in acetone, benzene or petroleum ether.

*Example 3*

A solution of 500 mg. of 3-[β-keto-γ-(1-carbethoxy-3-methoxy-2-piperidyl)-propyl]-4-quinazolone in 5 cc. of 48% hydrobromic acid was refluxed for twenty minutes, then evaporated to dryness in vacuo. The residue was dissolved in 5 cc. of absolute alcoholic hydrogen chloride and diluted with 15 cc. of acetone. The solution deposited 40 mg. of buff-colored crystals of 3-[β-keto-γ-(3-hydroxy-2-piperidyl)propyl]-4-quinazolone dihydrochloride dihydrate, M. P. 204–206° dec. This compound has a quinine coefficient of 50.

*Example 4*

A solution of 200 mg. of 3-[β-keto-γ-(1-carbethoxy-3-methoxy-2-piperidyl)-propyl]-4-quinazolone in 10 cc. of 6 N hydrochloric acid was refluxed for four hours, then evaporated to dryness in vacuo. The residue was dissolved in 3 cc. of absolute alcohol and the evaporation repeated. Crystallization from absolute alcoholic hydrogen chloride gave 70 mg. of white crystals of 3-[β-keto-γ-(3-methoxy-2-piperidyl)propyl]-4-quinazolone dihydrochloride, M. P. 193–197° dec. Recrystallization from methanol by the addition of absolute alcoholic hydrogen chloride gave white crystals of a monohydrate, M. P. 155–159° dec. This dihydrochloride was soluble in water or hot methanol, but insoluble in ethanol, acetone or benzene. This compound has a quinine coefficient of 10.

*Example 5*

A solution of 200 mg. of 3-[β-keto-γ-(1-carbethoxy-3-methoxy-2-piperidyl)-propyl]-4-quinazoline in 2 cc. of 9 N sulfuric acid was refluxed for four hours. The sulfate ions were exactly removed with barium chloride, the barium sulfate removed and the filtrate evaporated to dryness in vacuo. The residue was dissolved in methanol, filtered, evaporated to dryness and crystallized from absolute alcoholic hydrogen chloride; yield, 39 mg., M. P. 202–204° dec. of 3-[β-keto-γ-(3-methoxy-2-piperidyl)-propyl]-4-quinazolone dihydrochloride.

*Example 6*

A solution of 200 mg. 3-[β-keto-γ-(1-carbethoxy-3-methoxy-2-piperidyl)-propyl]-4-quinazolone in 6 cc. of 24% hydrobromic acid was refluxed for forty minutes. The product was isolated as in example 4; yield, 55 mg. of 3-[β-keto-γ-(3-methoxy-2-piperidyl) propyl]-4-quinazolone dihydrochloric monohydrate, M. P. 158–160° dec.

*Example 7*

By the condensation of 2.1 g. of 6-chloro-4-quinazolone (J. Am. Chem. Soc., 68, 1304) in 15 cc. of 1 N sodium methoxide with 1-carbethoxy-2-(γ-bromoacetonyl)-3-methoxypiperidine in the same manner as in Example 2 was obtained 1.3 g. of 3-[β-keto-γ-(1-carbethoxy-3-methoxy-2-piperidyl)propyl]-6-chloro-4-quinazolone, M. P. 124–125°. This compound forms white crystals readily soluble in alcohol, acetone, ethyl acetate, chloroform or benzene, but insoluble in water or petroleum ether.

A solution of 1.2 g. of 3-[β-keto-γ-(1-carbethoxy-2-piperidyl)-propyl]-6-chloro-4-quinazolone in 12 cc. of 6 N hydrochloric acid was refluxed for four hours, then evaporated to dryness in vacuo. The residue was dissolved in 10 cc. of absolute alcohol and the evaporation repeated. Crystallization from absolute alcoholic hydrogen chloride gave 370 mg. of white crystals of 3-[β-keto-γ-(3-methoxy-2-piperidyl) propyl]-6-chloro-4-quinazolone dihydrochloride monohydrate, M. P. 205–206° dec. This compound was soluble in water or methanol, but insoluble in ethanol, acetone, or benzene. It had a quinine coefficient of 10.

*Example 8*

A stirred solution of 49.5 g. or 7-chloroisatin (Helv. chim. acta, 2, 239) in 485 cc. of 5% sodium hydroxide was treated with 73 cc. of 30% hydrogen peroxide over a period of twenty minutes. The solution was stirred twenty minutes longer, clarified with Norit and acidified; yield, 36 g. of 3-chloroanthranilic acid, M. P. 187–188°.

A mixture of 35.2 g. of 3-chloroanthranilic acid and 31 cc. of formamide was heated at 130–135° for forty-five minutes and at 175° for seventy-five minutes. Addition of 50 cc. of Cellosolve and 500 cc. of water gave 31 g. of 8-chloro-4-quinazolone which formed white crystals on recrystallization from methyl Cellosolve, M. P. 299–300°.

By condensation of 1.7 g. of 8-chloro-4-quinazolone in 9.8 cc. of 1 N sodium methoxide with 3.2 g. of 1-carbethoxy-2-γ-bromoacetonyl)-3-methoxy piperidine according to Example 2 was obtained 1.09 g. of white crystals, M. P. 153–154° of 3-[β-keto-γ-(1-carbethoxy-3-methoxy-2-piperidyl) propyl]-8-chloro-4-quinazolone. This compound is soluble in acetone, chloroform or benzene, but insoluble in water or petroleum ether.

A solution of 0.985 g. of 3-[β-keto-γ-(1-carbethoxy-3 - methoxy - 2 - piperidyl) - propyl] - 8 - chloro - 4 - quinazolone in 10 cc. of 6 N hydrochloric acid was refluxed four hours. The white crystals of 3-[β-keto-γ-(3-methoxy-2-piperidyl) propyl]-8-chloro-4-quinazolone dihydrochloride hemihydrate, M. P. 209–211° dec., were isolated according to Example 7. This compound is soluble in water or hot methanol, but insoluble in acetone or benzene.

*Example 9*

A solution of 11.8 g. of 4 - chloro - 7 - methoxyisatin (Helv. chim. acta, 2, 239) in 100 cc. of 5% sodium hydroxide was treated with 15 cc. of 30% hydrogen peroxide over a period of ten minutes. After ten minutes more the solution was clarified with Norit and neutralized with hydrochloric acid. The 3-methoxy-6-chloroanthranilic acid crystallized; yield, 6.7 g., M. P. 145–146° after recrystallization from aqueous methanol.

A mixture of 2.4 g. of 3-methoxy-6-chloroanthranilic acid and 1 cc. of formamide was fused in the same manner as described for 8-chloro-4-quinazolone in Example 8. The resultant 5-chloro-8-methoxy-4-quinazolone (2.1 g.) formed white crystals from Cellosolve, M. P. 311–313° dec.

By condensation of 1.8 g. of 5-chloro-8-methoxy-4-quinazolone in 9.4 cc. of 1 N methanolic sodium methoxide and 15 cc. of methyl Cellosolve with 3.1 g. of 1 - carbethoxy - 2 - γ - bromoacetonyl) - 3 - methoxy - piperidine in 31 cc. of methanol according to Example 2 was obtained 0.65 g. of white crystals of 3-[β-keto-γ-(1-carbethoxy - 3 - methoxy - 2 - piperidyl propyl] - 5 - chloro-8-methoxy-4-quinazolone, M. P. 145–146°. This compound is soluble in alcohol, chloroform, ethyl acetate or benzene and insoluble in water or petroleum ether.

A solution of 1.75 g. of 3-[β-keto-γ-(1-carbethoxy-3 - methoxy - 2 - piperidyl) - propyl] - 5 - chloro - 8 - methoxy-4-quinazolone in 15 cc. of 6 N hydrochloric acid was refluxed for hour hours. The 3-[β-keto-γ-(3-methoxy-2-piperidyl)propyl]-5-chloro - 8 - methoxy - 4 - quinazolone dihydrochloride monohydrate was isolated according to Example 7; yield, 250 mg. of white crystals, M. P. 201–202° dec. This compound is soluble in water of hot methanol, but insoluble in ethanol, acetone or ether.

*Example 10*

A solution of 125 mg. of 3-[β-keto-γ-(3-methoxy-2-piperidyl)propyl]-4-quinazolone dihydrochloride in 5 cc. of 48% hydrobromic acid was refluxed for thirteen minutes, then evaporated to dryness in vacuo. The evaporation was repeated with 3 cc. of absolute alcohol. The residue was crystallized from absolute alcoholic hydrogen chloride; yield, 50 mg. of white crystals of 3 - [β - keto - γ - (3 - hydroxy - 2 - piperidyl)propyl] - 4 - quinazolone dihydrochloride dihydrate, M. P. 204° dec. This compound had a quinine coefficient of 50 and was soluble in water or hot methanol, but insoluble in ethanol, acetone, ether, ethyl acetate or benzene.

*Example 11*

A solution of 380 mg. of 3-[β-keto-γ-(3-methoxy-2-piperidyl)propyl] - 6 - chloro - 4 - quinazolone dihydrochloride in 5 cc. of 48% hydrobromic acid was refluxed for ten minutes. The white crystals of 3-[β-keto-γ-(3-hydroxy - 2 - piperidyl)propyl] - 6 - chloro - 4 - quinazolone dihydrochloride monohydrate, M. P. 255° dec., were isolated according to Example 10; yield, 160 mg. This compound has a quinine coefficient of 70 and is soluble in water or hot methanol, but is insoluble in acetone, ethyl acetate or benzene.

*Example 12*

To a solution of 65.7 g. of ethyl phenoxymalonate (J. Am. Chem. Soc., 62, 1155) in 66 cc. of t-butyl alcohol was added 0.6 g. of sodium methoxide and 15.4 cc. of acrylonitrile. After ten minutes the mixture was heated at 100° under a condenser for one hour, then acidified with 2 cc. of acetic acid, washed with water and distilled. The product, ethyl cyanoethyl phenoxymalonate, was a colorless oil. B. P. 158° (0.1 mm.); yield, 67.5 g. This compound is soluble in alcohol, acetone, carbon tetrachloride or toluene, but is insoluble in water.

A mixture of 60 g. of ethyl cyanoethyl phenoxymalonate and 120 cc. of diethyl Carbitol was shaken with hydrogen at 2–3 atm. in the presence of Raney nickel at 100° for about fifteen hours when two mol-equivalents of hydrogen were absorbed. The filtered solution was evaporated at 10 mm. up to a bath temperature of 130°. The residue was an oil of 3-carbethoxy-3-phenoxy-2-piperidone; yield, 55 g.

3-carbethoxy-3-phenoxy-2-piperidone was converted to 3 - [β - keto - γ - (1 - carbethoxy - 3 - phenoxy - 2 - piperidyl)propyl] - 4 - quinazolone in the same manner that 3-carbomethoxy-3-methoxy-2-piperidone was converted to 3 - [β - keto - γ - (1 - carbethoxy - 3 - methoxy - 2 - piperidyl) propyl]-4-quinazolone as described in Example 2.

A solution of 1.4 g. of 3-[β-keto-γ-(1-carbethoxy-3-phenoxy-2-piperidyl)-propyl]-4-quinazolone in 14 cc. of 48% hydrobromic acid was refluxed for twenty minutes. The white crystals of 3-[β-keto-γ-(3-hydroxy-2-piperidyl)-propyl]-4-quinazolone dihydrochloride dihydrate were isolated in the same manner as described in Example 3.

*Example 13*

By condensation of 1.94 g. of 7-chloro-4-quinazolone (J. Am. Chem. Soc., 69, 184) in 11 cc. of 1 N sodium methoxide with 3.65 g. of 1-carbethoxy-2-(γ-bromoacetonyl)-3-methoxypiperidine according to Example 2 was obtained 0.99 g. of 3-[β-keto-γ-(1-carbethoxy-3-methoxy-2-piperidyl)propyl]-7-chloro-quinazolone as white crystals, M. P. 125–126°. This compound is insoluble in water or petroleum ether, but soluble in methanol, chloroform or benzene.

A solution of 0.905 g. of 3-[β-keto-γ-(1-carbethoxy-3-methoxy-2-piperidyl)propyl]-7-chloro-4-quinazolone in 10 cc. of 6 N hydrochloric acid was refluxed for four hours. The white crystals of 3-[β-keto-γ-(3-methoxy-2-piperidyl)propyl]-7-chloro-4-quinazolone dihydrochloride hemihydrate, M. P. 209–210° dec., were isolated according to Example 7. This compound is soluble in water or hot methanol, but insoluble in ethanol, ether or acetone.

A mixture of 308 mg. of 3-[β-keto-γ-(3-methoxy-2-piperidyl)-propyl]-7-chloro-4-quinazolone dihydrochloride hemihydrate and 5 cc. of 48% hydrobromic acid was refluxed for ten minutes. The white crystals of 3 - [β - keto - γ - (3 - hydroxy - 2 - piperidyl)propyl] - 7 - chloro - 4 - quinazolone dihydrochloride dihydrate, M. P. 191–192° dec., were isolated as in Example 10; yield, 187 mg. This compound has a quinine coefficient of 75 and is soluble in water, but insoluble in ether, acetone or benzene.

Example 14

By condensation of 1.69 g. of 7-methyl-4-quinazolone (J. prakt. Chem., (2), 51, 566) in 11 cc. of 1 N sodium methoxide with 3.65 g. of 1-carbethoxy-2-(γ-bromoacetonyl)-3-methoxypiperidine according to Example 2 was obtained 3.1 g. of 3-[β-keto-γ-(1-carbethoxy-3-methoxy-2-piperidyl)propyl]-7-methyl-4-quinazolone as an oil. This oil was refluxed with 31 cc. of 6 N hydrochloric acid for four hours. The white crystals of 3-[β-keto-γ-(3-methoxy-2-piperidyl)propyl]-7-methyl-4-quinazolone dihydrochloride hemihydrate, M. P. 229° dec., were isolated according to Example 7; yield, 0.575 g. This compound is soluble in water, but insoluble in acetone, ethanol or ether.

A solution of 555 mg. of 3-[β-keto-γ-(3-methoxy-2-piperidyl)-propyl]-7-methyl-4-quinazolone dihydrochloride hemihydrate in 6 cc. of 48% hydrobromic acid was refluxed for ten minutes. The white crystals of 3-[β-keto-γ-(3-hydroxy-2-piperidyl)propyl]-7-methyl-4-quinazolone dihydrochloride monohydrate, M. P. 212–213° dec., were isolated as in Example 13; yield, 340 mg. This compound has a quinine coefficient of 40 and is soluble in water, but insoluble in ethanol, ether or benzene.

Example 15

Fusion of 12.6 g. of 6-chloroanthranilic acid (Monats., 22, 488) with 11 cc. of formamide according to Example 8 gave 10.4 g. of tan crystals of 5-chloro-4-quinazolone, M. P. 210° after recrystallization from aqueous methyl Cellosolve.

By condensation of 2.1 g. of 5-chloro-4-quinazolone in 12 cc. of 1 N sodium methoxide with 4 g. of 1-carbethoxy-2-(γ-bromoacetonyl)-3-methoxypiperidine according to Example 2 was obtained 4 g. of 3-[β-keto-γ-(1-carbethoxy - 3 - methoxy - 2 - piperidyl)propyl] - 5 - chloro - 4 - quinazolone as a gum. This material was refluxed with 40 cc. of 6 N hydrochloric acid for four hours. The white crystals of 3-[β-keto-γ-(3-methoxy-2-piperidyl)propyl]-5-chloro-4-quinazolone dihydrochloride hemihydrate, M. P. 200° dec., were isolated according to Example 7; yield, 0.66 g. This compound is soluble in water or hot methyl Cellosolve, but insoluble in ethanol, acetone or ether.

Example 16

A solution of 640 mg. of 3-[β-keto-γ-(3-methoxy-2-piperidyl)-propyl]-5-chloro-4-quinazolone dihydrochloride hemihydrate in 7 cc. of 48% hydrobromic acid was refluxed for ten minutes. The nearly white crystals of 3 - [β - keto - γ - (3 - hydroxy - 2 - piperidyl)propyl] - 5 - chloro - 4 - quinazolone dihydrochloride monohydrate, M. P. 223° dec., were isolated as in Example 10; yield, 393 mg. This compound has a quinine coefficient of 75 and is soluble in water, but insoluble in acetone, ethanol or toluene.

Example 17

By condensation of 1.85 g. of 5-methyl-4-quinazolone (Ber., 52, 1084) in 12 cc. of 1 N sodium methoxide with 4 g. of 1-carbethoxy-2-(γ-bromoacetonyl)-3-methoxypiperidine according to Example 2 was obtained 3.9 g. of 3 - [β - keto - γ - (1 - carbethoxy - 3 - methoxy - 2 - piperidyl) - propyl] - 5 - methyl - 4 - quinazolone as a gum. This crude material was refluxed for four hours with 38 cc. of 6 N hydrochloric acid. The white crystals of 3 - [β - keto - γ - (3 - methoxy - 2 - piperidyl)propyl] - 5 - methyl - 4 - quinazolone dihydrochloride monohydrate, M. P. 223° dec., were isolated as in Example 7; yield, 0.66 g. This compound is soluble in water or hot methanol, but insoluble in ether, acetone or ethanol.

Example 18

A solution of 640 mg. of 3-[β-keto-γ-(3-methoxy-2-piperidyl)propyl]-5-methyl-4-quinazolone dihydrochloride monohydrate in 7 cc. of 48% hydrobromic acid was refluxed for ten minutes. The crystals of 3-[β-keto-γ-(3-hydroxy-2-piperidyl)propyl]-5-methyl-4-quinazolone dihydrochloride monohydrate, M. P. 225° dec., were isolated according to Example 10. The compound has a quinine coefficient of 100 and is soluble in water, but insoluble in ethanol, acetone or ether.

Example 19

Fusion of 15.1 g. of 3.5-dichloroanthranilic acid (J. Am. Chem. Soc., 69, 3142) with 11.1 cc. of formamide according to Example 8 gave 13.2 g. of 6,8-dichloro-4-quinazolone as white crystals, M. P. 337–338° dec. This compound is insoluble in common solvents cold, but is soluble in aqueous alkali or hot Cellosolve.

By condensation of 2.46 g. of 6.8-dichloro-4-quinazolone in 12 cc. of 1 N sodium methoxide and 10 cc. of methyl Cellosolve with 3.95 g. of 1-carbethoxy-2-(γ-bromo-acetonyl)-3-methoxypiperidine according to Example 2 was obtained 2.4 g. of white crystals of 3-[β-keto - γ - (1 - carbethoxy - 3 - methoxy - 2 - piperidyl)-propyl] - 6,8 - dichloro - 4 - quinazolone, M. P. 130°, soluble in benzene, chloroform or methanol, but insoluble in water or petroleum ether.

A mixture of 2.3 g. of 3 - [β - keto - γ - (1 - carbethoxy - 3 - methoxy - 2 - piperidyl)propyl] - 6,8 - dichloro - 4 - quinazolone and 20 cc. of 6 N hydrochloric acid was refluxed for four hours. The white crystals of 3-[β-keto-γ-(3-methoxy-2-piperidyl)propyl]-6,8-dichloro-4-quinazolone dihydrochloride, M. P. 235° dec., were isolated as in Example 7; yield, 0.69 g. This compound is soluble in water, but insoluble in ethanol, acetone, or ether.

Example 20

A solution of 670 mg. of 3-[β-keto-γ-(3-methoxy-2-piperidyl)propyl]-6,8-dichloro-4-quinazolone dihydrochloride in 7 cc. of 48% hydrobromic acid was refluxed for ten minutes. The white crystals of 3-[β-keto-γ-(3-hydroxy-2-piperidyl)propyl]-6,8-dichloro-4-quinazolone dihydrochloride, M. P. 240° dec., were isolated as in Example 10; yield, 350 mg. This compound has a quinine coefficient of 200 and is soluble in water, but insoluble in ethanol, acetone or benzene.

Example 21

A mixture of 18.4 g. of 6-bromo-anthranilic acid (J. Pharm. Soc. Jap., 58, 461 (1938)), and 13.2 cc. of formamide was fused in the same manner as described for 8-chloro-4-quinazolone in Example 8. The resultant 5-bromo-4-quinazolone (14.9 g.) formed tan crystals from alcohol, M. P. 237–238° dec.

By condensation of 2.55 g. of 5-bromo-4-quinazolone in 12 cc. of 1 N methanolic sodium methoxide, with 3.9 g. of 1-carbethoxy-2-(γ-bromoacetonyl)-3-methoxypiperidine in 39 cc. of methanol was obtained according to Example 2; 3.9 g. of 3-[β-keto-γ-(1-carbethoxy-3-methoxy-2-piperidyl)propyl]-5-bromo-4-quinazolone as a gum soluble in alcohol, acetone or ether, but insoluble in water or petroleum ether.

A solution of 3.9 g. of this crude gum in 39 cc. of 6 N hydrochloric acid was refluxed for four hours. The 3 - [β - keto - γ - (3 - methoxy - 2 - piperidyl)propyl] - 5 - bromo - 4 - quinazolone dihydrochloride was isolated according to Example 7; yield, 450 mg. of white crystals, M. P. 211° dec.

Example 22

A solution of 430 mg. of 3-[β-keto-γ-(3-methoxy-2-piperidyl)propyl]-5-bromo - 4 - quinazolone dihydrochloride in 5 cc. of 48% hydrobromic acid was refluxed for ten minutes. The white crystals of 3-[β-keto-γ-(3-hydroxy-2-piperidyl)propyl]-5-bromo-4-quinazolone dihydrochloride monohydrate, M. P. 217° dec., were isolated according to Example 10; yield, 295 mg. This compound has a quinine coefficient of 50 and is soluble in water or hot methanol, but is insoluble in acetone, ether or ethyl acetate.

Example 23

To a stirred mixture of 13 cc. of water and 132 cc. of 96% sulfuric acid was added 28.2 g. of 3-chloro-4-methyl-α-isonitrosoacetanilide (Helv. chim. acta, 2, 234

(1919)) in portions at 65–70°. The temperature was maintained at 79–81° for fifteen minutes more, then the mixture was poured on ice. The crude isatin mixture was dissolved in 500 cc. of water and 125 cc. of 10% sodium hydroxide by warming. The solution was clarified by filtration, then partially acidified in portions to give six crops of crystals. The early fractions were the desired 4-chloro-5-methylisatin which formed bright red crystals from acetic acid, M. P. 242–244° (25% yield).

By oxidation of 6.3 g. of 4-chloro-5-methylisatin with alkaline peroxide as described in Example 8 for 3-chloroanthranilic acid was obtained 4.3 g. of 5-methyl-6-chloroanthranilic acid which formed crystals from ethyl acetate-heptane, M. P. 156–157°.

A mixture of 3.3 g. of 5-methyl-6-chloroanthranilic acid and 2.7 cc. of formamide was fused in the same manner as described for 8-chloro-4-quinazolone in Example 8. The 5-chloro-6-methyl-4-quinazolone (2.8 g.) formed yellow crystals from methyl Cellosolve, M. P. 248–249°.

By condensation of 2.38 g. of 5-chloro-6-methyl-4-quinazolone in 12.8 cc. of 1 N methanolic sodium methoxide with 4.2 g. of 1-carbethoxy-2-(γ-bromoacetonyl)-3-methoxy-piperidine in 42 cc. of methanol as described in Example 2 was obtained 4.5 g. of 3-[β-keto-γ-(1-carbethoxy-3-methoxy-2-piperidyl)propyl]-5-chloro-6-methyl-4-quinazolone as a gum soluble in methanol, chloroform or benzene, but insoluble in petroleum ether or water.

A solution of 4.5 g. of this gum in 45 cc. of 6 N hydrochloric acid was refluxed for four hours. The 3-[β-keto-γ-(3 - methoxy - 2 - piperidyl)propyl]-5-chloro-6-methyl-4-quinazolone dihydrochloride was isolated according to Example 7; yield, 450 mg. of white crystals, M. P. 226° dec. This compound is soluble in water, but insoluble in acetone or ether.

*Example 24*

A solution of 430 mg. of 3-[β-keto-γ-(3-methoxy-2-piperidyl)propyl]-5-chloro-6-methyl-4-quinazolone dihydrochloride in 5 cc. of 48% hydrobromic acid was refluxed for ten minutes. The white crystals of 3-[β-keto-γ-(3-hydroxy - 2 - piperidyl)propyl]-5-chloro-6-methyl-4-quinazolone dihydrochloride dihydrate, M. P. 235° dec., were isolated according to Example 10; yield, 355 mg. This compound has a quinine coefficient of 75 and is soluble in water, but insoluble in acetone, benzene or ether.

*Example 25*

3,4-dimethyl-α-isonitrosoacetanilide (56 g.) was prepared by condensation of 3.4-dimethylaniline (42 g.) with chloral hydrate and hydroxylamine hydrochloride according to Sandmeyer (Helv. chim. acta 2, 234 (1919)). This compound formed white crystals from ethyl acetate, M. P. 179–180°.

By cyclization of 55 g. of 3,4-dimethyl-α-isonitrosoacetanilide with 29 cc. of water and 290 cc. of 96% sulfuric acid according to Example 23 was obtained 4,5-dimethylisatin (12 g.) which formed red crystals from 50% alcohol, M. P. 225–226°.

Oxidation of 12 g. of 4,5-dimethylisatin with alkaline peroxide as described in Example 10 gave 7.3 g. of 5,6-dimethylanthranilic acid which formed white crystals from toluene, M. P. 140–141° dec.

A mixture of 5 g. of 5,6-dimethylanthranilic acid and 5.2 cc. of formamide was fused in the same manner as described for 8-chloro-4-quinazolone in Example 8. The 5,6-dimethyl-4-quinazolone (2.2 g.) formed white crystals from aqueous methyl Cellosolve, M. P. 247–248° dec.

By condensation of 2.01 g. of 5,6-dimethyl-4-quinazolone in 12 cc. of 1 N methanolic sodium methoxide with 3.96 g. of 1-carbethoxy-2-(γ-bromoacetonyl)-3-methoxypiperidine in 39 cc. of methanol as described in Example 2 was obtained 4.2 g. of 3-[β-keto - γ - (1-carbethoxy-3-methoxy-2-piperidyl)propyl] - 5,6 - dimethyl-4-quinazolone as a gum soluble in methanol, ethyl acetate or chloroform, but insoluble in water or petroleum ether.

A solution of 3.9 g. of this gum in 39 cc. of 6 N hydrochloric acid was refluxed for four hours. The 3-[β-keto-γ-(3-methoxy - 2 - piperidyl)propyl]-5,6-dimethyl-4-quinazolone dihydrochloride hemihydrate was isolated according to Example 7; yield, 430 mg. of white crystals, M. P. 223° dec. This compound is soluble in water or hot methanol, but insoluble in ethanol or ether.

*Example 26*

A solution of 410 mg. of 3-[β-keto-γ-(3-methoxy-2-piperidyl)propyl]-5,6-dimethyl - 4 - quinazolone dihydrochloride in 5 cc. of 48% hydrobromic acid was refluxed for ten minutes. The white crystals of 3[β-keto-γ-(3 - hydroxy-2-piperidyl)propyl]-5,6-dimethyl-4-quinazolone dihydrochloride sesquihydrate were isolated according to Example 10; yield, 260 mg., M. P. 229° dec. This compound has a quinine coefficient of 70 and is soluble in water, but insoluble in ethanol, ethyl acetate or toluene.

*Example 27*

3-trifluoromethyl-α-isonitrosoacetanilide (31 g.) was obtained by condensation of 25 g. of 3-trifluoromethylaniline with chloral hydrate and hydroxylamine according to Sandmeyer (Helv. chim. acta, 2, 234 (1919)). This compound formed white crystals from toluene, M. P. 141–142°.

By cyclization of 13.8 g. of 3-trifluoromethyl-α-isonitrosoacetanilide with 63 cc. of 96% sulfuric acid according to Example 23 was obtained 6 g. of 4-trifluoromethylisatin which formed orange crystals from xylene, M. P. 223–225°.

Oxidation of 11.4 g. of 4-trifluoromethylisatin with alkaline peroxide as described in Example 8 gave 5.5 g. of 6-trifluoromethylanthranilic acid which formed white crystals from toluene-heptane, M. P. 131–132°.

A mixture of 4.7 g. of 6-trifluoromethylanthranilic acid and 4 cc. of formamide was fused at 130° for two hours at 175° for two hours. The 5-trifluoromethyl-4-quinazolone (3.9 g.) was isolated as described in Example 10 for 8-chloro-4-quinazolone. This compound formed white crystals from water, M. P. 236–237°.

By condensation of 2.32 g. of 5-trifluoromethyl-4-quinazolone in 11.3 cc. of 1 N methanolic sodium methoxide with 3.7 g. of 1-carbethoxy-2-(γ-bromoacetonyl)-3-methoxy-piperidine in 37 cc. of methanol as described in Example 2 was obtained 4.1 g. of 3-[β-keto-γ-(1-carbethoxy - 3 - methoxy-2-piperidyl)propyl]-5-trifluoromethyl-4-quinazolone as a gum soluble in methanol, chloroform or benzene, but insoluble in water or petroleum ether.

A solution of 3.7 g. of this gum in 37 cc. of 6 N hydrochloric acid was refluxed for four hours. The 3-[β-keto-γ-(3 - methoxy - 2 - piperidyl)propyl]-5-trifluoromethyl-4-quinazolone dihydrochloride was isolated according to Example 7; yield, 455 mg. of white crystals, M. P. 215° dec. This compound is soluble in water, but insoluble in ethanol or ether.

*Example 28*

A solution of 435 mg. of 3-[β-keto-γ-(3-methoxy-2-piperidyl)propyl]-5-trifluoromethyl-4-quinazolone dihydrochloride in 5 cc. of 48% hydrobromic acid was refluxed for ten minutes. The white crystals of 3-[β-keto-γ-(3-hydroxy-2-piperidyl)propyl] -5-trifluoromethyl-4-quinazolone dihydrochloride were isolated according to Example 10; yield, 210 mg., M. P. 211° dec. This compound has a quinine coefficient of 30 and is soluble in water, but insoluble in ethanol ether or benzene.

*Example 29*

A solution of 3 g. of 6-methoxyanthranilamide (Ann., 388, 23 (1912)) in 30 cc. of 89% formic acid was heated at 100° for two and one-half hours, then evaporated to dryness in vacuo. Crystallization from water gave 2.5 g. of 2-formylamino-6-methoxybenzamide as white crystals, M. P. 175–176°.

A mixture of 2.5 g. of 2-formylamino-6-methoxybenzamide and 39 cc. of 3% sodium hydroxide was warmed a few minutes until solution was complete. Acidification gave 2 g. of 5-methoxy-4-quinazolone, which formed white crystals from water, M. P. 208–209°.

By condensation of 1.95 g. of 5-methoxy-4-quinazolone in 11.7 cc. of 1 N methanolic sodium methoxide and 11 cc. of methyl Cellosolve with 3.8 g. of 1-carbethoxy-2-(γ-bromoacetonyl)-3-methoxypiperidine in 38 cc. of methanol as described in example 2 was obtained 3.8 g. of 3-[β-keto-γ-(1-carbethoxy-3-methoxy-2-piperidyl)propyl]-5-methoxy-4-quinazolone as a gum soluble in methanol, chloroform or benzene, but insoluble in water or petroleum ether.

A solution of 3.3 g. of this gum in 33 cc. of 6 N hydrochloric acid was refluxed for four hours. The 3-[β-keto-γ-(3-methoxy-2-piperidyl)propyl]-5-methoxy-4-quinazolone dihydrochloride monohydrate was isolated according to Example 7; yield, 305 mg. of white crystals, M. P. 173-174° dec. This compound is soluble in water, but insoluble in ethanol, ether or ethyl acetate.

*Example 30*

A solution of 185 mg. of 3-[β-keto-γ-(3-methoxy-2-piperidyl)propyl]-5-methoxy-4-quinazolone dihydrochloride in 3 cc. of 48% hydrobromic acid was refluxed for ten minutes. The white crystals of 3-[β-keto-γ-(3-hydroxy-2-piperidyl)propyl]-5-methoxy-4-quinazolone dihydrochloride dihydrate, M. P. 224° dec., were isolated according to Example 10; yield, 115 mg. This compound has a quinine coefficient of 30 and is soluble in water, but insoluble in ethanol, ether or benzene.

*Example 31*

To a solution of 6 g. of 5-amino-4-quinazolone (J. Am. Chem. Soc., 28, 208 (1906)) in 71 cc. of 42% fluoroboric acid cooled to 0° was added with stirring a solution of 2.85 g. of sodium nitrite in 4.5 cc. of water in portions. The mixture was stirred at 0° for one-half hour, then diluted with 71 cc. of absolute alcohol and 50 cc. of ether. The solid diazonium fluoroborate (11.4 g.) separated. A mixture of 10 g. of this solid and 200 cc. of xylene was refluxed and stirred for ten minutes. The mixture was cooled, the solid was collected on a filter and dissolved in 100 cc. of water. The solution was clarified by filtration, then adjusted to pH 5 with sodium bicarbonate and extracted with six 15 cc. portions of ethyl acetate. The combined, dried extracts were evaporated leaving 3 g. of 5-fluoro-4-quinazolone which formed white crystals from ethyl acetate, M. P. 225-227°.

By condensation of 2.29 g. of 5-fluoro-4-quinazolone in 14.4 cc. of 1 N methanolic sodium methoxide with 4.8 g. of 1-carbethoxy-2-(γ-bromoacetonyl)-3-methoxypiperidine in 48 cc. of methanol as described in Example 2 was obtained 4.6 g. of 3-[β-keto-γ-(1-carbethoxy-3-methoxy-2-piperidyl)propyl]-5-fluoro-4-quinazolone as a gum soluble in methanol, chloroform or benzene, but insoluble in water or petroleum ether. A solution of 4.6 g. of this gum in 46 cc. of 6 N hydrochloric acid was refluxed for four hours. The 3-[β-keto-γ-(3-methoxy-2-piperidyl)propyl]-5-fluoro-4-quinazolone dihydrochloride was isolated according to Example 7; yield, 690 mg. of white crystals, M. P. 206° dec. This compound is soluble in water, but insoluble in ethanol, acetone or ethyl acetate.

*Example 32*

A solution of 670 mg. of 3-[β-keto-γ-(3-methoxy-2-piperidyl)propyl]-5-fluoro-4-quinazolone dihydrochloride in 7 cc. of 48% hydrobromic acid was refluxed for ten minutes. The white crystals of 3-[β-keto-γ-(3-hydroxy-2-piperidyl)propyl]-5-fluoro-4-quinazolone dihydrochloride hemihydrate, M. P. 216° dec., were isolated according to Example 10; yield, 350 mg. This compound has a quinine coefficient of 70 and is soluble in water, but insoluble in ethanol, acetone or benzene.

*Example 33*

6,7-benzo-4-quinazolone was prepared by fusion of 3-amino-2-naphthoic acid with formamide as described for 8-chloro-4-quinazolone in Example 8. The product was obtained in about 85% yield and had a melting point of about 273-274° C.

3-[beta-keto-gamma-(1-carbethoxy-3-methoxy-2-piperidyl)propyl]-6,7-benzo-4-quinazolone was prepared by condensation of 1-carbethoxy-2-(gamma-bromoacetonyl)-3-methoxypiperidine with 6,7-benzo-4-quinazolone in the presence of sodium methoxide as described for 4-quinazolone in Example 2. The product was obtained in a yield of about 50% and had a melting point of about 167-168°.

3-[beta-keto-gamma(3-hydroxy-2-piperidyl)propyl]-6,7-benzo-4-quinazolone dihydrochloride was prepared by hydrolysis of 3-[beta-keto-gamma-(1-carbethoxy-3-methoxy-2-piperidyl)propyl]-6,7-benzo-4-quinazolone with HCl according to the procedure of Example 27 followed by hydrolysis with HBr according to the procedure of Example 28. The product crystallized as the sesquihydrate and had a melting point with decomposition of about 202° C.

*Example 34*

3-[beta-keto-gamma(3-hydroxy-2-piperidyl)propyl]-5-nitro-4-quinazolone dihydrochloride was prepared by the procedure of Example 33 except that 6-nitroanthranilic acid was substituted for the 3-amino-2-naphthoic acid of that example. The product crystallized as the hemihydrate and had a melting point with decomposition of about 209-210° C.

*Example 35*

A mixture of 25 gms. of 5-nitro-4-quinazolone, 250 cc. of methyl Cellosolve, and 2 gm. of 10% palladium-charcoal was shaken with hydrogen at 2-3 atm. until reduction was complete (one hour). The filtered solution was evaporated to dryness in vacuo leaving about 19.6 gms. of nearly white crystals of 5-amino-4-quinazolone having a melting point of about 225-227° C.

5-acetamino-4-quinazolone was prepared by refluxing 5-amino-4-quinazolone with acetic anhydride followed by evaporation in vacuo. On recrystallization from water there was obtained white needles having a melting point of about 286-287° C.

3-[beta-keto-gamma(3-methoxy-2-piperidyl)propyl]-5-amino-4-quinazolone dihydrochloride was prepared by condensation of 5-acetamino-4-quinazolone with 1-carbethoxy-2-(gamma-bromo-acetonyl)-3-methoxy piperidine followed by hydrolysis with HCl as in Example 27.

A solution of 655 mg. of 3-[beta-keto-gamma-(3-methoxy-2-piperidyl)propyl]-5-amino-4-quinazolone dihydrochloride in 7 cc. of 48% hydrobromic acid was refluxed ten minutes, then evaporated to dryness in vacuo. The residue, dissolved in 6 cc. of water, was stirred with 3 cc. of acetic anhydride for ten minutes. Evaporation to dryness in vacuo left a solid which was dissolved in 10 cc. of absolute alcohol and the evaporation repeated. The residue was heated to boiling with 10 cc. of absolute alcoholic hydrogen chloride, then cooled in an ice bath. The resulting 3-[beta-keto-gamma(3-hydroxy-2-piperidyl)-propyl]-5-acetamino-4-quinazolone dihydrochloride was removed and washed with 1:3 absolute alcohol-acetone.

*Example 36*

A warm solution of 10 g. of 5-amino-4-quinazolone in 200 cc. of water and 22.7 cc. of 12 N hydrochloric acid was cooled in an ice bath, which caused the hydrochloride salt to separate. After the slow addition of 4.77 g. of sodium nitrite with shaking, the red solution was allowed to stand in an ice bath for 1 hour. The excess nitrous acid was destroyed with urea. The cold diazonium solution was added in a thin stream to a stirred solution of 4 cc. of methanethiol in 150 cc. of water containing 35 g. of potassium hydroxide. The temperature was maintained at 40-50° C. during addition and for 1 hour more, then it was raised to 70° C. for 10 minutes. The warm solution was acidified with acetic acid and allowed to stand overnight to complete crystallization. Several recrystallizations from 25% alcohol gave white crystals of 5-methylthio-4-quinazolone having a melting point of about 271-272° C.

3-[beta-keto-gamma(3-hydroxy-2-piperidyl)propyl]-5-methylthio-4-quinazolone dihydrochloride was prepared by condensation of 5-methylthio-4-quinazolone with 1-carbethoxy-2-(gamma-bromoacetonyl)-3-methoxypiperidine followed by hydrolysis as in Example 33. The product crystallized as the dihydrate having a melting point with decomposition of about 229° C.

Other new compounds of this invention are prepared by the same procedures illustrated in the above examples. Reference is made to the Journal of Organic Chemistry, vol. 17, No. 1, January 1952, where many other new compounds of this invention are disclosed and their properties given.

This application is a continuation-in-part of U. S. application S. N. 184,118, filed September 9, 1950, now abandoned.

We claim:

1. Compounds selected from the group consisting of quinazolones represented by the formula:

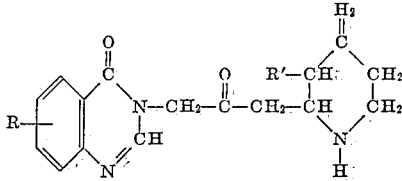

wherein R represents at least one substituent selected from the group consisting of hydroxy groups, nitro groups, lower acylamido groups, halogen substituents, lower alkyl groups, and lower alkyl mercapto groups; and R' represents a member selected from the group consisting of hydrogen, hydroxy groups and lower acyloxy groups; and addition salts thereof with mineral acids.

2. The 3 - [beta - keto - gamma - (3 - hydroxy - 2-piperidyl)-propyl]-halo-4-quinazolones.

3. The 3 - [beta - keto - gamma - (3 - hydroxy - 2-piperidyl)-propyl]-chloro-4-quinazolons.

4. The new compound 3-[beta-keto-gamma-(3-hydroxy-2-piperidyl)-propyl]-5-chloro-4-quinazolone.

5. The 3 - [beta - keto - gamma - (3 - hydroxy - 2-piperidyl)-propyl]-bromo-4-quinazolones.

6. The new compound 3-[beta-keto-gamma-(3-hydroxy-2-piperidyl)-propyl]-5-bromo-4-quinazolone.

7. The 3 - [beta - keto - gamma - (3 - hydroxy - 2-piperidyl)-propyl]-5-(lower alkyl)-4-quinazolones.

8. The new compound 3-[beta-keto-gamma-(3-hydroxy-2-piperidyl)-propyl]-5-methyl-4-quinazolone.

9. The 3 - [beta - keto - gamma - (3 - hydroxy - 2-piperidyl)-propyl]-(lower alkyl)-4-quinazolones.

10. The new compound 3-[beta-keto-gamma-(3-hydroxy-2-piperidyl)-propyl]-5,6-dimethyl-4-quinazolone.

11. The 3 - [beta - keto - gamma - (3 - hydroxy - 2-piperidyl) - propyl] - 5 - halo - 6 - (lower alkyl) - 4-quinazolones.

12. The new compound 3-[beta-keto-gamma-(3-hydroxy - 2 - piperidyl) - propyl] - 5 - chloro - 6 - methyl-4-quinazolone.

13. A method of preparing compounds selected from the group consisting of those having the formula:

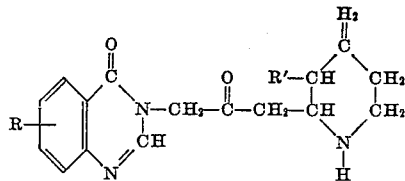

wherein R represents at least one member selected from the group consisting of hydrogen, hydroxy groups, nitro groups, lower acylamido groups, halogen substituents, lower alkyl groups, and lower alkyl mercapto groups; and R' represents a member selected from the group consisting of hydrogen, hydroxy groups and lower acyloxy groups; and addition salts thereof with mineral acids; which comprises subjecting a compound having the formula

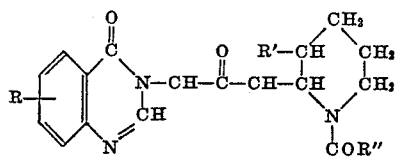

wherein R and R' are as defined above and COR" is an acyl group, to hydrolysis until the group COR" has been replaced with a hydrogen atom.

14. A process as in claim 12 wherein the hydrolysis is carried out in the presence of a strong acid.

15. A process as in claim 12 in which the hydrolysis is carried out with hydrochloric acid.

16. A process in accordance with claim 12 wherein the hydrolysis is carried out with sulfuric acid.

No references cited.